United States Patent
Contreras et al.

(10) Patent No.: US 9,787,522 B1
(45) Date of Patent: Oct. 10, 2017

(54) DATA PROCESSING SYSTEM HAVING FAILOVER BETWEEN HARDWARE AND SOFTWARE ENCRYPTION OF STORAGE DATA

(75) Inventors: Cesareo Contreras, Northbridge, MA (US); Atul Kabra, New Delhi (IN); Michael E. Bappe, Loveland, CO (US); Edith Epstein, Arlington, MA (US); Helen S. Raizen, Jamaica Plain, MA (US); Alexander Elpaev, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 1624 days.

(21) Appl. No.: 13/172,172

(22) Filed: Jun. 29, 2011

(51) Int. Cl.
 *H04L 29/00* (2006.01)
 *H04L 29/08* (2006.01)
 *H04L 29/06* (2006.01)

(52) U.S. Cl.
 CPC ...... *H04L 29/067* (2013.01); *H04L 29/08549* (2013.01)

(58) Field of Classification Search
 None
 See application file for complete search history.

(56) References Cited

U.S. PATENT DOCUMENTS

2005/0015471 A1* 1/2005 Zhang et al. ................. 709/221
2008/0101605 A1* 5/2008 Kitamura et al. ............ 380/239
2009/0080656 A1* 3/2009 Hughes et al. ............... 380/277
2010/0031062 A1* 2/2010 Nishihara et al. ............ 713/193

OTHER PUBLICATIONS

Wikipedia—Host Bus Adapter—Nov. 2014 [Retrieved on Apr. 28, 2015]. Retrieved from <http://en.wikipedia.org/wiki/Host_adapter>.*

* cited by examiner

*Primary Examiner* — Tri Tran
(74) *Attorney, Agent, or Firm* — BainwoodHuang

(57) ABSTRACT

A computer of a data processing system includes a software encryption engine and path circuitry that initially provides one or more paths for conveying data of storage I/O requests to and from a storage device, the paths including an encrypting path having a hardware encrypting component. According to a failover technique, in a first operating state, (a) the data of the storage I/O requests is conveyed via the encrypting path with encryption and decryption of the data being performed by the hardware encrypting component, and (b) monitoring is performed for occurrence of an event indicating that the hardware encrypting component has become unavailable for encrypting and decrypting the data of the storage I/O requests. Upon occurrence of the event, if the path circuitry provides a non-encrypting path for conveying the data of the storage I/O requests to and from the storage device, then operation is switched to a second operating state in which the data of the storage I/O requests is conveyed via the non-encrypting path and is encrypted and decrypted by the software encryption engine. A failback technique provides for reverting to hardware-assisted encryption under proper circumstances.

12 Claims, 10 Drawing Sheets

DATA PROCESSING SYSTEM HAVING FAILOVER BETWEEN HARDWARE AND SOFTWARE ENCRYPTION OF STORAGE DATA

BACKGROUND

The present invention is related to the field of data processing, in particular to storage-related operation of data processing systems.

In data processing systems, it is known to utilize a set of input/output (I/O) functional components or drivers in a host computer to realize an interface to an external data storage system. The functional components of an I/O interface stack generally perform different types of functions at different logical layers in a coordinated fashion in order to obtain all the desired functionality of the interface. As an example, a high-level I/O driver may interact with a so-called "multi-pathing" driver that has knowledge of multiple distinct paths to storage devices and that uses the knowledge to distribute storage I/O commands among the different paths in a way that improves performance or achieves other system goals (such as enhanced availability). The multipathing driver in turn relies on one or more lower-level drivers, including a driver for a host bus adapter that provides a hardware-level interface to a storage-oriented interconnect bus that connects the host computer to the storage system.

It is also generally known to utilize data encryption in storage systems for encryption of data "at rest" (i.e., residing on a storage device) to protect against loss or unauthorized access to such data. Data encryption may be performed in software, in hardware, or using some combination of software and hardware. Encryption may be performed in a specialized storage controller of a storage system or in a host computer accessing a storage system via a storage interconnection bus.

SUMMARY

Data processing systems support encrypted storage volumes or devices for purposes of securing data at rest, for example to prevent unauthorized access to sensitive information stored on a storage device. Operation requires that the data of write-type storage I/O commands for such devices be encrypted before being written to the device, and that the data of read-type storage I/O commands be decrypted before it is used by a requestor. The inability to perform encryption and/or decryption renders an encrypted storage device inaccessible. While this is the intended beneficial result vis-à-vis an unauthorized access, it can be very problematic if it occurs during regular trusted operation of a system. Encryption and decryption represent a potential point of failure. Thus it can be important that measures are taken to assure adequate availability of encrypted storage devices.

Some data processing systems, including some systems employing multipathing as mentioned above, may support encryption through use of a hardware-level encryption component. For example, an encrypting host bus adapter may include encryption/decryption circuitry that includes a hardware encrypting component such as a specialized encryption/decryption integrated circuit or module. As encryption and decryption can be operation-intensive, the use of specialized hardware circuitry can provide for improved performance over an alternative approach using software encryption. However, such hardware circuitry is specialized and expensive, and represents a particular point of failure that can negatively affect availability.

The presently disclosed data processing system provides support for hardware encryption for performance while also promoting high availability of encrypted storage devices, even in the event of failure of the hardware encryption circuitry or other hardware components along an I/O path that includes such hardware encryption circuitry. The system employs a particular form of redundancy, in particular a software encryption engine and a mechanism for switching between use of the hardware encryption circuitry and the software encryption engine, so that an encrypted storage device remains accessible (albeit at generally reduced performance). The technique promotes both high performance and high availability, especially in systems having a mix of encrypting and non-encrypting paths to storage devices.

More particularly, a method is disclosed of operating a data processing system to support encryption of data of a storage device, the method including maintaining a software encryption engine and path circuitry that initially provides one or more paths for conveying data of storage I/O requests to and from the storage device, where the paths include an encrypting path having a hardware encrypting component (e.g., one or more custom or semi-custom integrated circuits with special hardware design and/or firmware specifically tailored for performing encryption/decryption operations fast and efficiently).

In a first operating state, the data of the storage I/O requests is conveyed to the storage device via the encrypting path, with encryption and decryption of the data being performed by the hardware encrypting component. Monitoring is performed for occurrence of an event indicating that the hardware encrypting component has become unavailable for encrypting and decrypting the data of the storage I/O requests. An example of such an event is a failure of the hardware encrypting component itself, or failure of other circuitry in the encrypting path rendering the path unusable for data transfer.

Upon occurrence of the event indicating that the hardware encrypting component has become unavailable for encrypting and decrypting the data of the storage I/O requests, then if the path circuitry provides at least one non-encrypting path for conveying the data of the storage I/O requests to and from the storage device, operation is switched to a second operating state in which the data of the storage I/O requests is conveyed via a non-encrypting path and is encrypted and decrypted by the software encryption engine.

By the above technique, the data processing system continues to provide for encryption and decryption of data of the storage device despite the loss (temporary or permanent) of the hardware-level encryption and decryption functionality of the hardware encrypting component. Although encryption/decryption operation will generally be slower when done by the software encryption engine, in many cases slower operation will be preferable to an alternative of simply making the storage device unavailable due to the inability to perform encryption and decryption of the data. The system exhibits desirable availability and robustness. Additionally, redundancy is obtained at generally lower cost than alternative techniques that rely on redundant hardware encrypting components, for example. Thus the technique may be useful in lower-cost systems that make only selective use of more expensive encrypting host bus adapters.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
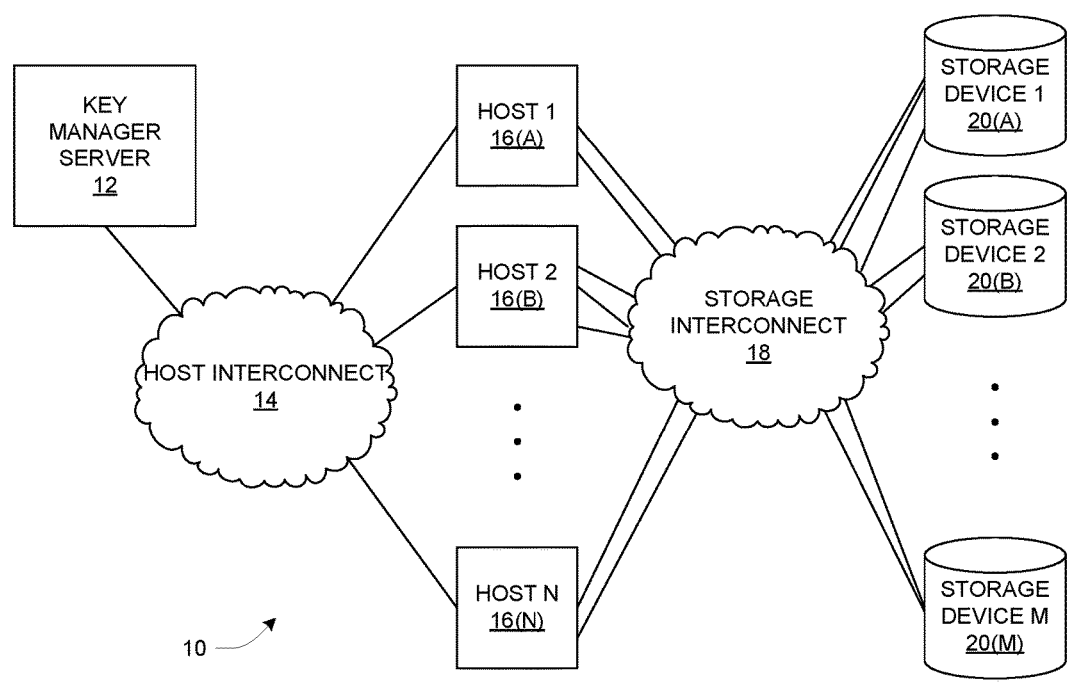
FIG. 1 depicts an example system for use in practicing various embodiments of the invention.

FIG. 1 depicts an example distributed computer system 10 (capable of performing as an encrypted data storage system) for use in performing various embodiments of the invention. System 10 includes a key manager server 12, a host interconnect 14, and one or more hosts 16 (depicted as hosts 16(a), 16(b), ..., 16(n)). Key manager server 12 and hosts 16 connect to each other via host interconnect 14. The hosts 16 also connect to storage devices 20 (depicted as storage devices 20(a), 20(b), ..., 20(m)) via a storage interconnect 18. In some embodiments, the host interconnect 14 and the storage interconnect 18 are combined.

In operation, the hosts 16 execute application programs that utilize the storage devices 20 for non-volatile data storage. The storage interconnect 18 may employ a storage-oriented protocol such as iSCSI or Fibre Channel to enable block-oriented read and write commands and the accompanying data to be transferred between the hosts 16 and storage devices 20. Additionally, the system 10 provides selective encryption of storage data by the hosts 16. The key manager server 12 and host interconnect 14 provide support for the data encryption function as described in more detail below.

Key manager server 12 provides key manager functionality, i.e., the generation, protection, storage, replacement, and elimination of data encryption keys and related data that are used in data encryption/decryption operations. In one embodiment, key manager server 12 is a server appliance. One example of a key manager server 12 usable in some embodiments is the RSA Data Protection Manager appliance manufactured by EMC Corp. of Hopkinton, Mass. It should be understood that this is by way of example only; other products may also serve as the key manager server 12.

Key manager server 12 and hosts 16 connect to each other via host interconnect 14. Host interconnect 14 may be, for example, a network, such as a local area network (LAN) or a wide area network (WAN). Host interconnect 14 may also be realized by a collection of one or more switches interconnecting key manager server 12 and hosts 16.

Hosts 16 are computers executing applications that store data on the data storage devices 20. In addition to connecting to the host interconnect 14, each host 16 also connects to the storage interconnect 18, typically via a plurality of independent connections. In one embodiment, the hosts 16 employ a multipathing function which establishes and utilizes multiple paths from a given host 16 to a given storage device 20, which can provide higher performance as well as redundancy for greater availability. Further detail regarding hosts 16 is provided below in connection with FIGS. 2 and 3.

The storage interconnect 18 can be any type of network or input/output (I/O) bus capable of interconnecting storage devices 20 with host computers 16. In some embodiments, the storage devices 20 and host 16 are interconnected in a manner such that, to the operating systems running on the hosts 16, the storage devices 20 appear as locally attached, but this is not required. The storage interconnect 18 may be a shared, public, or private network and encompass a wide area or local area and can be implemented through any suitable combination of wired and/or wireless communication networks. Furthermore, the storage interconnect 18 may include a LAN, a WAN, an intranet, the Internet, or a set of switches. For example, in one embodiment, the storage interconnect 18 works with Fibre Channel connectivity and is implemented in the form of a storage area network (SAN). In another embodiment, the storage interconnect 18 works with internet protocol (IP) connectivity and is implemented via an Internet-Small Computer System Interface (iSCSI) (e.g., for Fibre Channel). Those of skill in the art will recognize that other implementations are, of course, possible.

Storage devices 20 may be any sort of storage equipment capable of connecting to storage interconnect 18. In some embodiments, each storage device 20 is a disk array. As is well-known in the art, a typical disk array includes a disk array controller, disk enclosures holding a plurality of disk drives, and a power supply. A disk array may also include a cache. Examples of disk arrays include the Symmetrix Integrated Cache Disk Array System and the CLARiiON Disk Array System, both available from EMC Corp. of Hopkinton, Mass.

As mentioned, key manager server 12 controls the generation, protection, storage, use, replacement, and elimination of data encryption keys. In particular, key manager server 12 creates encryption keys and corresponding key identifiers. Each key identifier, referred to as a key id, is associated with a corresponding encryption key and can be used to obtain the key from the key manager server 12, provided that all permissions and credentials are in place.

Figure 2:
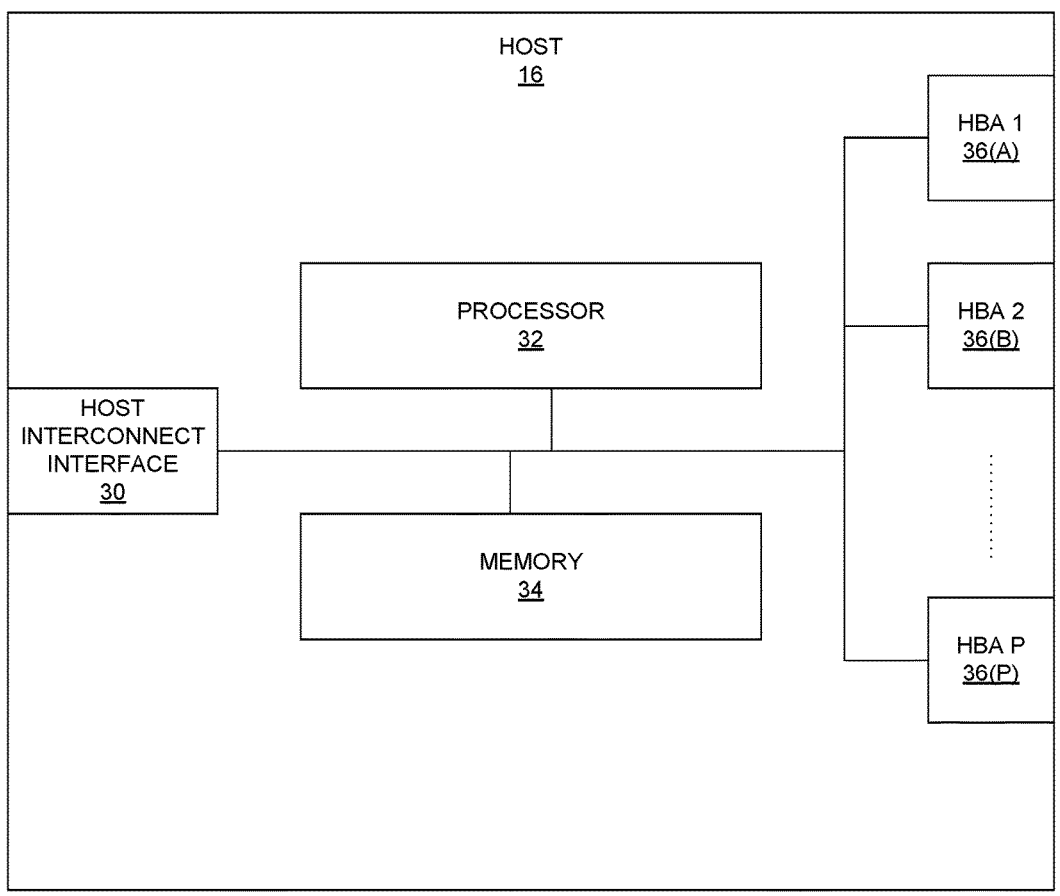
FIG. 2 depicts an example apparatus for use in practicing various embodiments of the invention.

FIG. 2 depicts a host 16 in greater detail. Each host 16 includes a host interconnect interface 30 for connecting to host interconnect 14, a processor 32, memory 34, and one or more host bus adapters (HBA) 36 (depicted as HBAs 36(A), 36(B), ..., 36(P)) for connecting to storage interconnect 18 over redundant paths. Processor 32 may be any sort of controller, such as, for example, a general purpose processor or microprocessor, a central processing unit, a set of multiple processing units, or a set of dedicated circuitry designed to perform particular operations in hardware. Memory 34 may be made up of one or more of the following: volatile random access memory, non-volatile read-only memory, non-volatile flash memory, magnetic storage, optical storage, etc.

As described in more detail below, the HBAs 36 may be either "encrypting" HBAs that perform encryption and decryption of storage data using dedicated hardware-level circuitry (not shown in FIG. 2), or "non-encrypting" HBAs that do not provide such hardware-level encryption and decryption. A host 16 may be configured in one of three general ways, namely (1) with all of its HBAs 36 being encrypting HBAs, (2) with all of its HBAs 36 being non-encrypting HBAs, and (3) with a mixture of encrypting and non-encrypting HBAs 36. It is expected that for the first configuration all data encryption would normally be performed at the hardware level (although it is also expected that an encrypting HBA will normally be usable in a non-encrypting operating mode as well), and that for the second configuration all data encryption is performed at the software level. The mixed configuration may be employed to achieve a desired balance of performance and cost, with some number of higher-cost encrypting HBAs being used as needed for performance reasons and the remainder of the HBAs 36 being lower-cost non-encrypting types. Viewed another way, not all devices 20 that the host 16 is connected to may be encrypted, and the non-encrypting HBAs provide access for the unencrypted devices. A failover technique is described below that may be useful in a either of configurations (1) or (3) where there may be a benefit to dynamically switching between hardware and software encryption.

Additionally, a host 16 may employ an explicit policy, either fixed or configurable, regarding the use of hardware versus software encryption. For example, the policy may be that hardware-level encryption is preferred whenever it is available, for performance as well as efficient use of hardware resources. Such a policy may be globally applied for all paths utilized by the host 16, or it may have a more selective application to meet other system needs. It is assumed herein that hardware-level encryption is preferred over software encryption.

Figure 3:
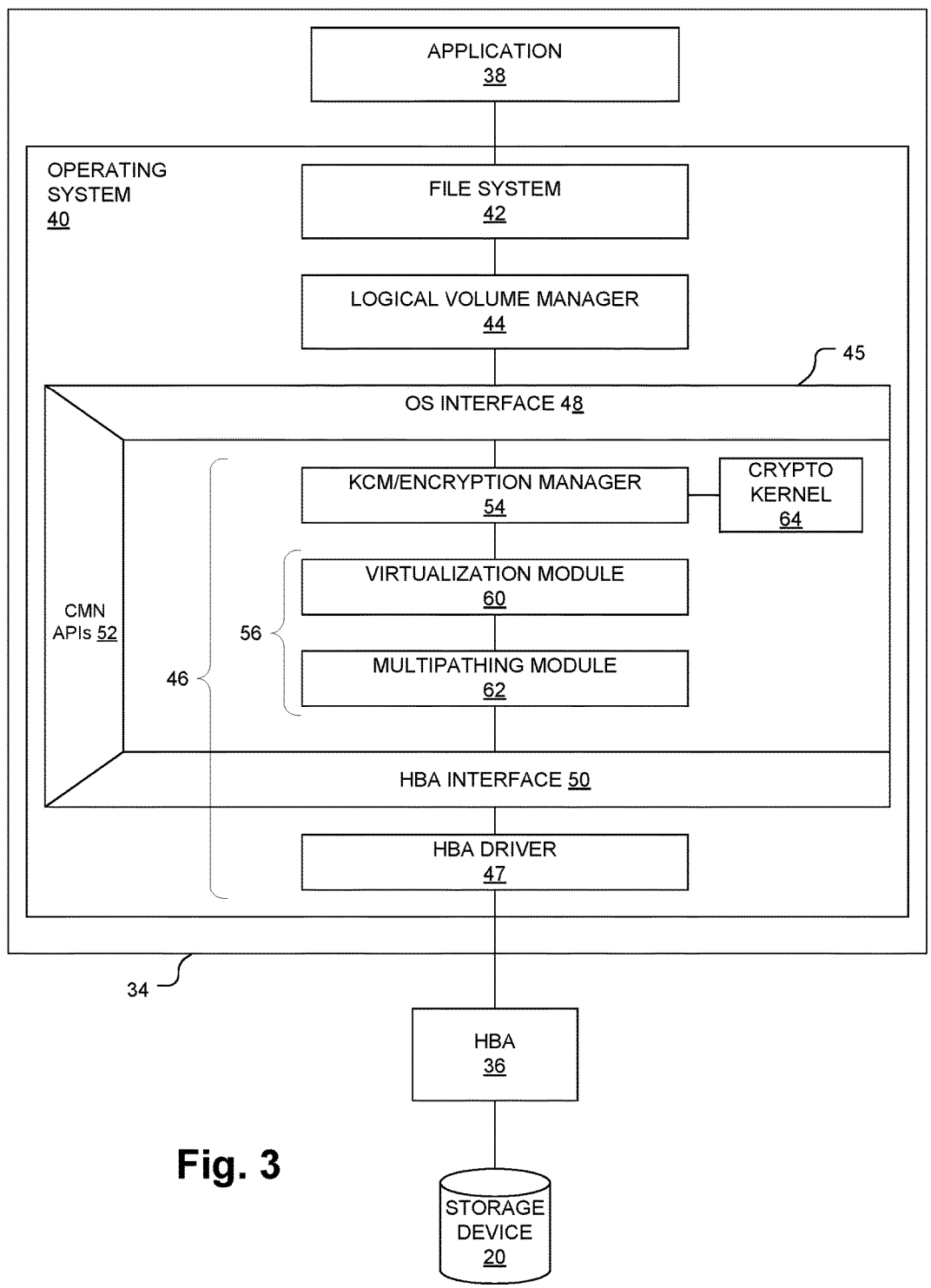
FIG. 3 depicts an arrangement of various components for use in practicing various embodiments of the invention.

FIG. 3 illustrates certain software that is contained within the memory 34 during system operation. As shown, in one embodiment, memory 34 stores one or more computer program applications 38 and an operating system (OS) 40. Applications 38 and OS 40 contain a set of instructions to be executed by processor 32. Memory 34 may also store application data.

OS 40 (which contains many well-known components that are not shown or described herein) includes a file system 42 and a logical volume manager 44. OS 40 also includes an input/output (I/O) filter driver 45 and an HBA driver 47. I/O filter driver 45 may be, for example, a component of the PowerPath Encryption With RSA software available from EMC Corp. of Hopkinton, Mass. I/O filter driver 45 includes an OS interface 48, an HBA interface 50, and a set of common application programming interfaces (CMN APIs) 52. I/O filter driver 45 also includes a key controller module (KCM) or encryption manager 54 and one or more intermediate layers (IL) 56. ILs 56 may include, for example, one or more virtualization modules 60 and multipathing modules 62. A software encryption engine shown as crypto kernel 64 may also be considered to be part of I/O filter driver 45. Portions of the I/O filter driver 45 and the HBA driver 47 may also make up storage I/O stack 46. It should be understood that this arrangement is by way of example only; in some embodiments, one or more components of the storage I/O stack 46 may be external to the I/O filter driver 45. In any case, for purposes of this disclosure, the storage I/O stack 46 includes components between the KCM 54 and a software interface to an encryption endpoint (EE) where encryption is performed (e.g., between KCM 54 and HBA driver 47).

The KCM 54 is generally responsible for managing the data encryption aspects of operation of the host 16 in which it resides. In some arrangements, the KCM 54 may arrange for the encryption to be performed by crypto kernel 64. However, since KCM 54 and crypto kernel 64 both run in software (running on processor 32), such operation may impose a performance penalty in terms of latency and/or throughput of data storage operations. Therefore, in some arrangements, KCM 54 is able to arrange for the encryption to be performed by hardware-level encrypting circuitry which may be located within one or more HBAs 36 as mentioned above. In many cases, such encrypting circuitry will include a combination of hardware and firmware. An HBA 36 that includes such encrypting circuitry may be referred to as an encrypting HBA or "EHBA", while an HBA 36 that does not include such encrypting circuitry may be referred to as a non-encrypting HBA or "NHBA". The term "hardware-assisted encryption" is used to refer to encryption being performed using such encrypting circuitry.

The various drivers and modules shown in FIG. 3 are also referred to using the term "functional components" elsewhere in this description.

Figure 4A:
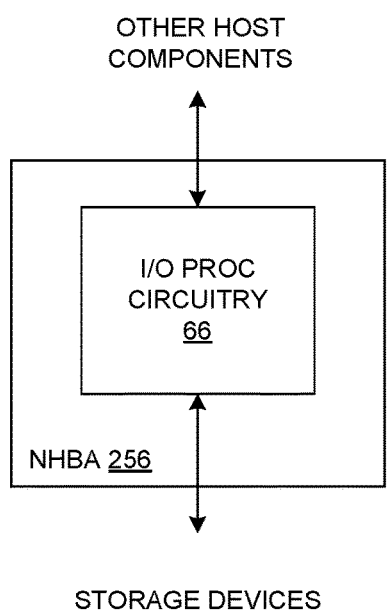
FIG. 4A is a block diagram of a non-encrypting host bus adapter.
Figure 4B:
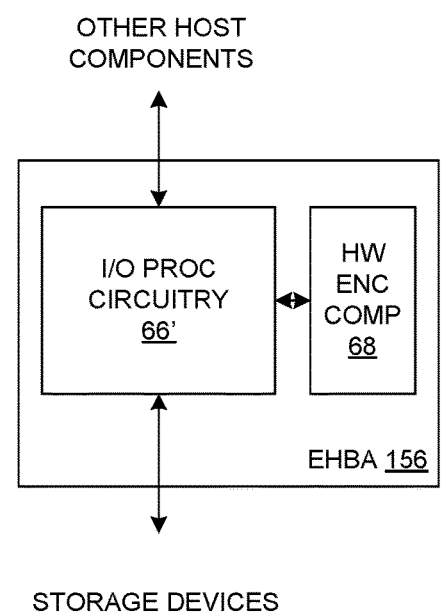
FIG. 4B is a block diagram of an encrypting host bus adapter.

FIGS. 4A and 4B are used to illustrate pertinent distinctions between an encrypting HBA (EHBA) and a non-encrypting HBA (NHBA). An example of an NHBA 256 is shown in FIG. 4A. It includes circuitry shown as I/O processing circuitry 66 having connections to other host components (processor 32, memory 34, etc. of FIG. 2), and connections to storage devices 20 via the storage interconnect 18 of FIG. 1. The I/O processing circuitry 66 is responsible for receiving storage I/O command messages from the OS 40, issuing corresponding storage I/O commands on the storage interconnect 18 using a storage-oriented protocol such as SCSI, and handling the associated data transfers (outgoing write data or received read data) between the storage devices 20 and the memory 34 of the host. The I/O processing circuitry 66 may be implemented in any of a variety of manners, including use of a specialized embedded processor and associated hardware circuitry as generally known in the art.

The EHBA 156 of FIG. 4B may be generally similar to the NHBA 256 except that it also includes a specialized hardware encrypting component (HW ENC COMP) 68 tailored to perform encryption and decryption of blocks of data under control of I/O processing circuitry 66'. When processing a storage write command, for example, the I/O processing circuitry 66' arranges for the hardware encrypting component 68 to encrypt the write data as it passes through the EHBA 156 to a storage device 20. Similarly, when processing a read command the I/O processing circuitry 66' arranges for the hardware encrypting component 68 to decrypt the read data as it passes through the EHBA 156 to the memory 34 of the host. Such operation requires a preceding phase in which the KCM 54 establishes encryption associations and information which are used by the EHBA 156 to perform encryption and decryption, as described more fully below. The hardware encrypting component 68 may be referred to by the art-recognized term "hardware security module" or HSM. Various HSMs are known in the art, and new HSMs are continually introduced. The EHBA 156 may be one of a family of HBA products sold by Emulex Corporation under the trademark OneSecure™.

One aspect of the EHBA 156 is the possibility of a failure of the hardware encrypting component 68 or some part of the I/O processing circuitry 66' that affects the ability of the EHBA 156 to perform encryption/decryption. In the event of any such failure, the EHBA 156 is not able to properly carry out a requested storage I/O operation that requires hardware-assisted encryption, resulting in a need to potentially switch to software encryption. In some cases the HBA driver 47 of FIG. 3 may detect a failure of the hardware encrypting component 68 and signal such failure to the multipathing module 62 by "failing" the I/O request being processed at time of failure. The multipathing module 62 in turn may attempt to deliver the I/O request via an alternate encryption-capable path. If that attempt fails, the I/O request is failed to levels above (e.g., to KCM 54). Here, "failing" an I/O may be effected by returning a particular error completion code in a SCSI command block for example.

In one embodiment, the KCM 54 sees this error completion code and initiates various actions to (1) ascertain whether the failure indeed represents loss of hardware-assisted encryption on the subject path, and (2) if so, transition operation to software encryption to continue to provide access to the encrypted storage volume. These actions are described in more detail below. As an alternative, it may be desirable that the system perform these actions upon failure of an I/O request to a hardware encrypted volume for any reason (not just particular error codes), because a switch to software encryption is required not only for failure of the hardware encrypting component 68 but also for failure of a link in the storage interconnect 18 connecting the EHBA 156 to the device 20.

Figure 5:
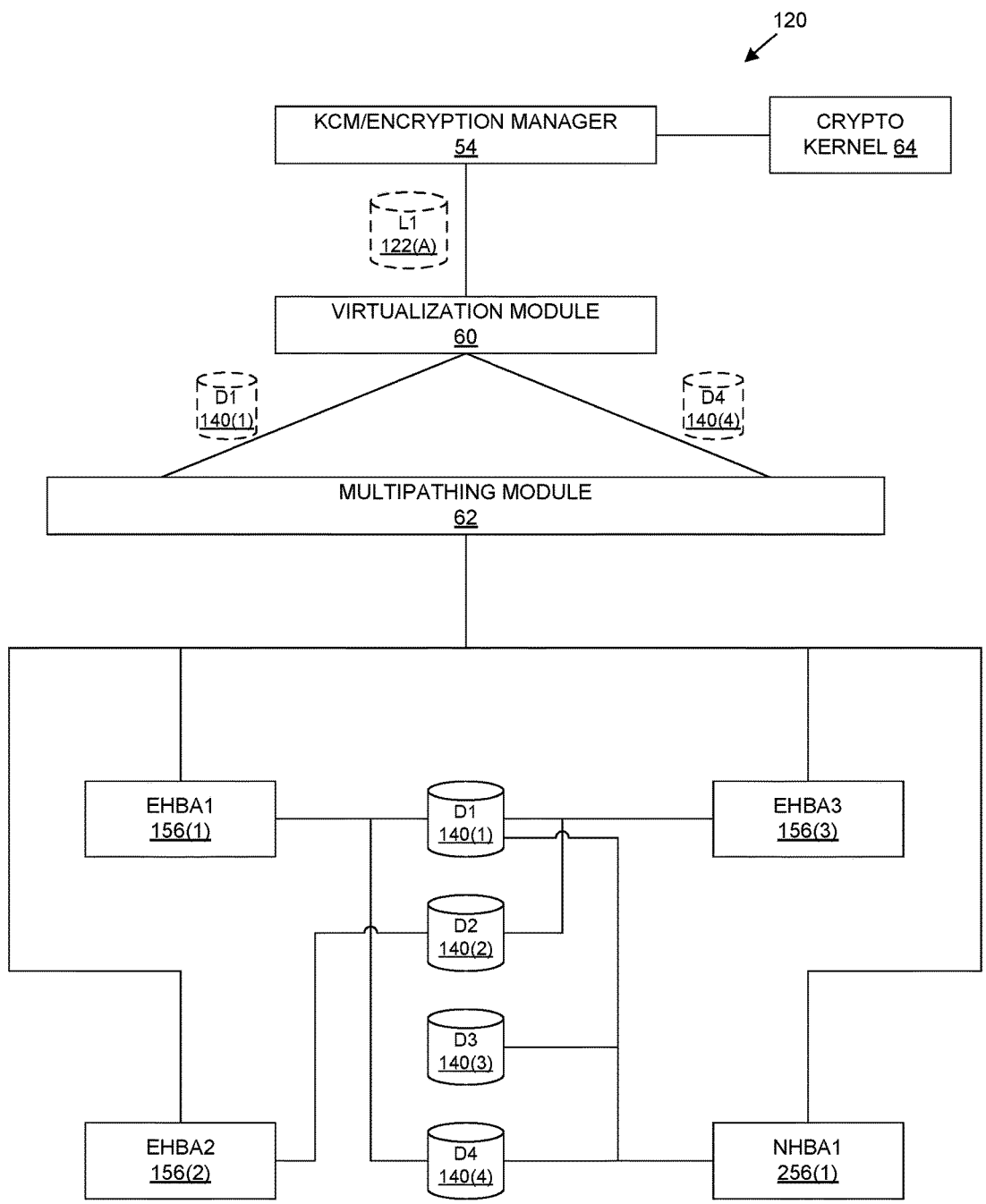
FIG. 5 depicts an example logical layout of a system for use in practicing various embodiments of the invention.

FIG. 5 depicts an example logical arrangement 120 of storage I/O stack 46 and other system elements according to one embodiment. In particular, FIG. 5 depicts functional connections within the storage I/O stack 46 and between the storage I/O stack 46 and certain disks of the storage devices 20 via respective HBAs 36. The disks 140(1)-140(4) are labeled D1-D4 respectively. The HBAs 36 are shown as EHBAs 156(1)-156(3) and an NHBA 256(1), where the terms EHBA and NHBA stand for "encrypting HBA" and "non-encrypting HBA" respectively.

A logical volume L1 122(*a*) is defined by virtualization module 60. Virtualization module 60 provides a "virtualization" system function, presenting a logical unit of data (LU) as a logical disk or logical volume (LV) to KCM 54 and to the OS 40 via OS interface 48 even though the LV may not actually be a contiguous physical entity, which is assumed to result in assigning logical blocks of L1 to specific storage devices 20. This virtualization may be, for example, a mirroring, a striping, or some combination thereof. In arrangement 120, logical volume L1 122(*a*) is shown as being virtualized across two storage devices D1 140(1) and D4 140(4). It should be understood that, throughout this description, the term LU is used to refer to a logical unit of data at any level of abstraction (e.g., as seen by the KCM 54, as seen by one of the ILs 56, or as seen by an HBA 36), while the term LV is used to specifically refer to an LU as seen by the KCM 54. In general, the virtualization module 60 maps one or more storage "extents" defined at an upper layer of the I/O stack 46 to corresponding storage extents defined at a lower layer of the I/O stack 46, and in operation it generally maps upper-layer data location information of an upper-layer I/O command to corresponding lower-layer data location information. The term "extent" refers to a (generally contiguous) set of addressable blocks of storage data. The mapping may be from one address location to another on a given device, for example, or even from one device to another (in the case of striping, for example). "Data location information" includes items such as a logical block address and length appearing in a storage command.

The multipathing module 62 provides a multipathing system function by which multiple paths to these storage devices are established through the storage interconnect 18 and utilized in operation for greater parallelism, availability, and performance. As depicted, multipathing module 62 connects to EHBA1 156(1), EHBA2 156(2), EHBA3 156(3), and NHBA1 256(1) (via the HBA driver interface 50 and HBA driver 47 of FIG. 3), and the following paths exist:

To D1 140(1) via EHBA1 156(1), EHBA3 156(3), and NHBA1 256(1)
To D2 140(2) via EHBA2 156(2) and EHBA3 156(3)
To D3 140(3) via NHBA1 256(1)
To D4 140(4) via EHBA1 156(1) and NHBA1 256(1).

It should be noted that FIG. 5 presents a simplified example which assumes that each HBA 156, 256 and storage device 140 has only one connection to the storage interconnect 18. In general, as depicted in FIG. 1, each HBA 36 and storage device 40 may have multiple such connections, and it will be appreciated that the number of potential paths between a given HBA 156, 256 and storage device 140 may be correspondingly greater.

In the configuration of FIG. 5, the only path to disk D3 140(3) is via NHBA1 256(1), which means that there is no hardware-assisted encryption available for encrypting/decrypting data of that disk. The significance of this incapability is described below.

In an arrangement such as that of FIG. 5, the multipathing module 62 is responsible for maintaining an awareness of which disks 140 it can "reach" (engage in I/O operations with) as well as the corresponding set of usable paths to each reachable disk. Techniques for maintaining such awareness are generally known in the art and are not elaborated herein, except that certain path-related events and responses thereto are described below with reference to a failover (change in operating mode) between hardware-assisted encryption and software encryption.

The virtualization module 60 maintains an awareness of the disks (e.g., D1 140(1) and D4 140(4)) which underlie each logical volume (e.g., L1 122(*a*)). Upon receiving storage commands (I/O commands including reads and writes of storage data) directed to logical volume L1 122(*a*), the virtualization module 60 generates corresponding storage commands to D1 and D4 and issues these commands to the multipathing module 62. The multipathing module 62 responds by selecting a path for each command and issuing the command to the HBA 36 for the selected path. Storage commands directed to an encrypted region of a disk 140 may utilize the hardware-assisted encryption provided by an EHBA 156 along a selected path. In the event that a disk 140 is not reachable via an EHBA 156 (such as disk D3 140(3) as mentioned above), any such storage commands will utilize the encryption functionality of the crypto kernel 64.

Figure 6A:
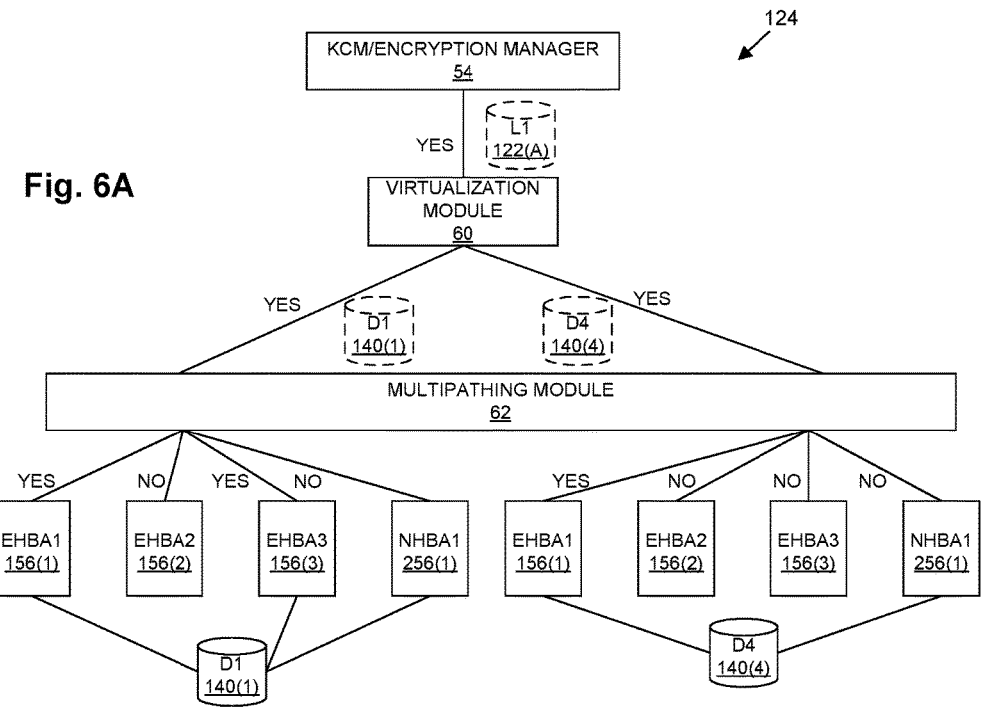
FIG. 6A depicts an example scenario according to one embodiment of the invention.
Figure 6B:
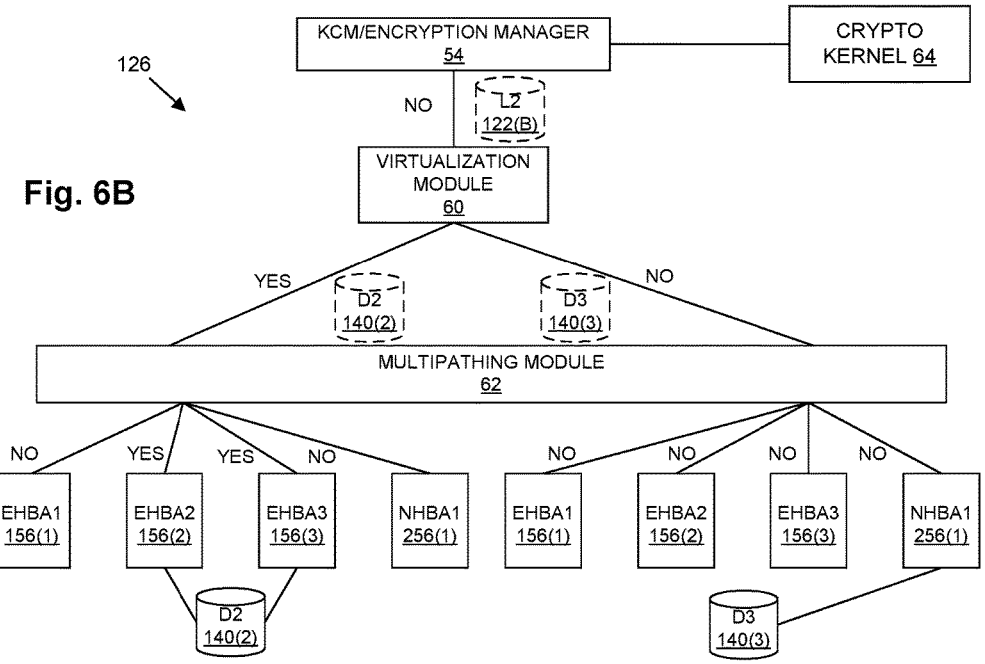
FIG. 6B depicts an example scenario according to another embodiment of the invention.

FIGS. 6A and 6B illustrate specific examples of the above-described operation in greater detail. In these figures, the labels "yes" and "no" are used to indicate whether a given HBA 156, 256 between the multipathing module 62 and a disk D1-D4 provides a path with hardware-assisted encryption to the disk. Thus, the label "no" appears for each NHBA 256 (because it is non-encrypting) and for each EHBA 156 that has no connection to a given disk D1-D4.

FIG. 6A depicts one arrangement 124 for disks D1 and D4 of logical volume L1. showing that logical volume L1 122(*a*) may be encrypted using hardware-assisted encryption, because each underlying storage device D1, D4 for L1 can be accessed through an EHBA 156. In particular, storage device D1 may be accessed with hardware-assisted encryption via EHBA1 156(1) and EHBA3 156(3) (as indicated by the "Yes" along the connections between multipathing module 62 and the EHBAs156(1) and 156(3) at the left side of FIG. 6A). Storage device D4 may be similarly accessed through EHBA1 156(1) (as indicated by the "Yes" along the connection between multipathing module 62 and EHBA1 156(1) at the right side of FIG. 6A). Thus, a combination of EHBA1 156(1) and EHBA3 156(3) may be used to perform all encryption operations for accessing logical volume L1 122(a).

FIG. 6B depicts an alternative arrangement 126 for a second logical volume L2 122(b) and its underlying disks D2 140(2) and D3 140(3). As shown, disk D3 is accessible only via NHBA1 256(1). Therefore, encrypted storage operations for logical volume L2 122(b) cannot utilize hardware-assisted encryption, because not all of its underlying storage devices (D3 in particular) can be accessed via an EHBA 156. Thus, in arrangement 126, crypto kernel 64 is used to perform the encryption operations required by any data storage operations to be performed on logical volume L2 122(b).

The above description in connection with FIGS. 5 and 6A-6B illustrates certain important aspects of using hardware-assisted encryption in a system such as that of FIG. 1. First, it must be possible for an EHBA 156 to obtain certain encryption metadata (including encryption key) for those regions of encrypted storage for which that EHBA 156 will handle data storage commands, so that the encryption circuitry (hardware encrypting component 68) of the EHBA 156 can perform the correct encryption/decryption operation using the correct key for each distinct region of storage. As the KCM 54 is the overall manager of encryption operations for the host 16 in which an EHBA 156 resides, a mechanism is needed to enable the KCM 54 to communicate the encryption metadata to its EHBAs 156. Additionally, a mechanism is needed for the KCM 54 to ascertain whether hardware-assisted encryption is available for any given region of storage. Both these needs are further complicated by the presence of ILs 56, especially those (like virtualization module 60) which are "remapping" layers that effect a translation or mapping between two different representations of a given storage volume. Additionally, even non-remapping layers like the multipathing module 62 create potential problems, because hardware-assisted encryption may not be available on all paths for a given disk 140, yet the system must ensure that encryption is performed reliably. All these issues point to the need for a communications protocol among the different layers of the storage I/O stack 46 to support the data encryption function.

Figure 7:
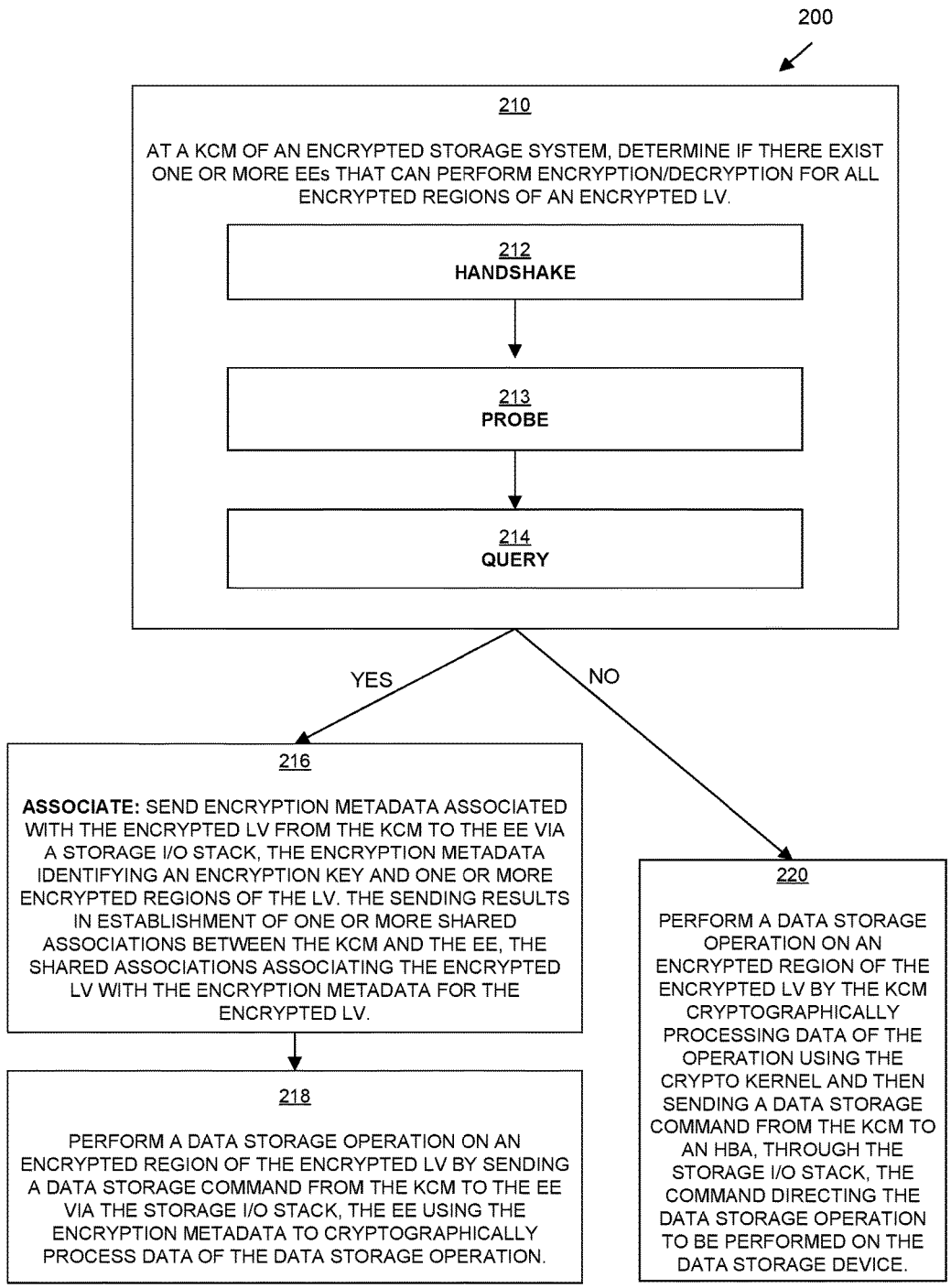
FIG. 7 depicts an example method according to one embodiment of the invention.

FIG. 7 depicts an example method 200 for setting up encryption on a logical disk (e.g., logical volume L1 122(a)) and then performing encrypted storage operations in an efficient manner. FIG. 7 is directed to the specific case of hardware-assisted encryption, but several aspects of the method are more generally applicable to the use of other types of encryption endpoints (EEs) which perform cryptographic processing (e.g., encryption, decryption, or both), as explained below. In one embodiment the method is performed using an "in-band" communications protocol among the various components of the storage I/O stack 46. Here "in-band" refers to the fact that communication related to the method is performed along the same path as the I/O. In one embodiment, specialized SCSI commands and responses, for example, are transported up and down the storage I/O stack 46 using an internal communications transport mechanism that includes use of a command data block (CDB) and a data buffer, wherein commands and responses of the communications protocol are transported via the data buffer. The communications protocol is referred to below as a "DEK management protocol," where the acronym DEK stands for "data encryption key."

By "up and down" the storage I/O stack 46 it is meant that a DEK management protocol command may be created by KCM 54 then passed to a top-level IL 56, such as virtualization module 60. That IL 56 examines the command and, in most cases (exceptional cases are discussed below), will send one or more corresponding commands to the next IL 56 down the stack, such as multipathing module 62. This pattern repeats until one or more commands reach HBA driver(s) 47. Responses flow in the other direction, from the HBA drivers 47 upward to the KCM 54. In some cases, commands may not travel completely down the storage I/O stack 46, and responses may be generated and sent upwards by one or more ILs 56. By this chain-like communications mechanism, information required for proper encryption-related operation is shared among the various components of the storage I/O stack 46. It will be appreciated that intermediate layers 56 may act as a responder for commands received from higher in the I/O stack 46, and also act as an initiator for commands being sent further down the I/O stack 46.

As mentioned above, a transport mechanism carries protocol communications messages to cause a functional component to execute a protocol-controlled processing action with respect to storage I/O commands. In the case of the DEK management protocol, the protocol-controlled processing action is the encrypting and decrypting of the data that is the subject of the storage I/O commands. Details of DEK management protocol messages and the use of the DEK management protocol for controlling encryption/decryption operation are now described.

In one embodiment, KCM 54 uses the DEK management protocol to first determine whether or not there is an EHBA 156 (or a set of multiple EHBAs 156) that can provide encryption for each encrypted region of the logical volume L1 122(a). If not, then it is deemed that EHBA encryption is not available, and the KCM 54 assumes responsibility for encryption/decryption operations for the logical volume L1 using the crypto kernel 64. If the KCM 54 determines that such EHBA encryption is available, it uses the DEK management protocol to provide the required encryption metadata to each EHBA 156 that requires it. Subsequently, storage commands directed to the logical volume L1 are sent down the stack 46 for execution, relying on operation of one or more EHBAs 156 for the data encryption/decryption part of operation for the encrypted regions.

As previously noted, encryption may be applied to separate "regions" of a given volume 122 or disk 140. Here "region" refers to a span of contiguous logical block addresses (LBAs). To illustrate the concept, assume a hypothetical simple volume 122 having 16 blocks of storage with addresses 0 through 15. The volume may have an encryption pattern as follows:

LBA range Encryption?
0-3 Not encrypted
4-12 Encrypted
13-15 Not encrypted

The overall pattern for a given logical unit of data (LU) is referred to below as a "LUN map" (the term "LUN" is commonly used in the industry to refer to an LU). In operation, it is necessary for the KCM 54 to provide the LUN map for each volume to any EHBA 156 that will handle I/O for that volume. It is assumed herein that only one data encryption key is used for each volume, although in general it is possible to use different keys for different regions, for example.

In a somewhat more realistic example, an encrypted LU may store metadata and formatting information in plaintext form. In addition, certain additional regions of an encrypted LU may be designated as unencrypted for various reasons (e.g., to enhance performance on a region that is frequently accessed). For example, logical volume L1 122(*a*) may be an encrypted LU having a size of 10 megabytes. Given a 512-byte block size, logical volume L1 122(*a*) has 20,480 blocks. Blocks 0-1023 may be unencrypted and reserved for operating system use, while blocks 1024-1535 may be unencrypted and reserved for storing encryption metadata. Blocks 1536-10,239 may be encrypted, blocks 10,240-11,263 may be unencrypted for performance reasons, and blocks 11,264-20,479 encrypted. Thus, only blocks 1536-10,239 and 11,264-20,479 of logical volume L1 122(*a*) are subject to encryption.

Additionally, the virtualization module 60 distributes the blocks of logical volume L1 122(*a*) out across D1 140(1) and D4 140(4). For example, blocks 0-10,239 may be stored on D1 140(1), while blocks 10,240-20,479 are stored on D4 140(4). This arrangement places portions of logical volume L1 122(*a*) subject to encryption on both D1 140(1) and D4 140(4). It should be noted that the mapping between L1 and D1/D2 may not (and in many cases will not) preserve LBAs. Thus blocks 0-10,239 of L1 may be mapped to blocks 32,000-42,239 of D1, for example.

Referring again to FIG. 7, in step 210, KCM 54 determines if there exist one or more EEs (e.g., EHBA(s) 156) that can perform encryption/decryption for all encrypted regions of an encrypted logical volume (LV). If step 210 returns an affirmative response, execution proceeds with step 216, while if step 210 returns a negative response, execution may proceed with step 220. At step 220, it is concluded that there is no EE to perform encryption/decryption for the subject volume/disk, which means that any required encryption/decryption operations are to be performed by the KCM 54 using the crypto kernel 64. As described above with reference to FIGS. 6A and 6B, in the present example the condition of step 210 is satisfied for logical volume L1 122(*a*). However, for logical volume L2 122(*b*), step 210 evaluates in the negative because there is no encrypted path to D3 140(3), and thus the method will execute step 220 with respect to logical volume L2 122(*b*). It should be noted that in some embodiments, even if an EHBA 156 is present in all paths to a storage device 20, condition 210 could still fail if an essential path (or an essential group of paths) is blocked by an error in the EHBA 156 (e.g., the EHBA 156 has no remaining capacity or is temporarily offline).

As shown in FIG. 7, step 210 may be accomplished by performing some or all of sub-steps 212-214, which perform handshake and query operations. In connection with these sub-steps, different specific commands and responses of the DEK management protocol are used as described more fully below. Table 1 provides a general structure for a DEK management protocol command block used in performing these operations:

TABLE 1

General command block format

| Bytes | Field |
| --- | --- |
| 0-7 | (8 bytes) Protocol Signature |
| 8-15 | (8 bytes) Checksum |
| 16-19 | (4 bytes) Version |
| 20-23 | (4 bytes) Reserved |
| 24-27 | (4 bytes) DEK Management protocol Opcode |

TABLE 1-continued

General command block format

| Bytes | Field |
| --- | --- |
| 28-31 | (4 bytes) DEK Management protocol Response Status |
| 32-39 | (8 bytes) DEK Management protocol Endpoint ID |
| 40-47 | (8 bytes) Key Controller Handle |
| 48-1535 | Command Specific Parameters and Data |

The general command block format is a structure having a format as shown in Table 1. In some embodiments, all commands are a maximum of 1536 bytes (3×512-byte blocks) long, although this is by way of example only. The fields and arguments are described below. In the description below, the label [In] means the parameter is an "input" passed from the KCM 54 in/down to the EE (via one or more ILs 56), while [Out] means the parameter is an "output" returned by the EE out/up to the KCM 54 (via one or more ILs 56). "Initiator" means the KCM 54 or IL 56 that generates a protocol command. "Device Object" means a device managed by a driver in the storage I/O stack 46. It may be a volume, an LV, an LU, a path device, or a storage device.

The following is a description of the various fields in the general command block shown in Table 1 above:

Protocol Signature—8 bytes—[In] identifies the contents as a DEK Management protocol Command, to distinguish DEK management protocol communications from other communications using the same in-band transport. During the "Handshake" command of step 212 (described below), the signature is set to a predefined value (e.g., 0x0a, 0x0b, 0x0c, 0x0d, 0x0e, 0x0f, 0x10, 0x11) by the KCM 54. The signature is echoed back unchanged by the EE for all commands. The protocol signature is an example of the identifying data discussed above.

Checksum—8 bytes—[In] Used as a means of validating (checking integrity of) a DEK management protocol command block. Contains a 32 bit cyclic-redundancy-check checksum of bytes 16 to 1535, stored in a longword. Calculated by the KCM 54 before sending the command down. Validating a DEK management protocol command helps protect against erroneous operation that may be caused by data errors. The checksum can also serve as protection against accidental misinterpretation of non-protocol data in the transport data buffer as a protocol command. In the very unlikely case that non-protocol data appears in the transport data buffer with a correct protocol signature and other attributes of a protocol command, it is extremely unlikely that the checksum also computes properly. Thus the checksum protects the integrity of the protocol messages.

Version—4 bytes—[In] DEK Management protocol version identifier.

DEK management protocol Opcode—4 bytes—[In] DEK Management protocol operation to be performed. Opcodes include values for Handshake, Probe, Query, Associate, Update, and Disassociate. If an EE had been doing encryption for a Device Object, it can release any resources associated with that object after a Disassociate command and can keep them released until it sees a new Associate command. Associations are described below.

DEK management protocol Response Status—4 bytes—[Out] Reports completion status for the protocol command. Set by the EE. Examined by the ILs 56 and potentially modified by them. Examined by the KCM 54. Valid values for this field can include Success as well as various values representing failure due to a number of possible errors.

DEK management protocol Endpoint ID—8 bytes—[In/Out] Unique identifier for the EE's use. Its content varies by Opcode: returned up to the KCM 54 on a Handshake and echoed (sent back down to) the EE in Query, Associate, Update, and Disassociate commands.

Key Controller Handle—8 bytes—[In] Contains a handle used by the Initiator to match a DEK management protocol response with its originating command. The EE and ILs 56 should echo/return this field unchanged.

Command Specific Parameters and data—Up to 1488 bytes of command-specific data. Examples are discussed below.

Referring again to FIG. 7, in step 212 (which may be omitted), KCM 54 sends a Handshake command down to the next IL 56 in order to test for the existence of an EE in the storage I/O stack 46.

The KCM 54 sends the Handshake command as the first DEK management protocol command to a Device Object. Only one handshake at a time should be outstanding to a given device object. The EE should not trigger an internal state change upon receipt of a Handshake, e.g., a Handshake command should not reset associations currently in effect for a Device Object.

Generally, KCM 54 will send one Handshake command per LV that it manages. As long as KCM 54 receives one affirmative Handshake response command block in response to the Handshake command, KCM 54 will proceed to step 214. Otherwise, KCM 54 will proceed with software encryption.

When an IL 56 receives a Handshake command from above in the storage I/O stack 46, it passes the command down to the next level down in the storage I/O stack 46. If the LU potentially involves multiple EEs of the storage I/O stack 46, then the IL will replicate the command block (potentially with modification as discussed below) and send a copy down the storage I/O stack 46 toward each such EE.

For example, if the IL 56 is a virtualization module 60 that virtualizes the LU across two storage devices 20(*a*) and 20(*b*), then virtualization module 60 sends two copies of the Handshake command block down the storage I/O stack 46, one referencing storage device 20(*a*) as the device object, and the other referencing storage device 20(*b*) as the device object. If the virtualization module 60 receives any affirmative Handshake response command blocks, the virtualization module 60 responds back to the KCM 54 with an affirmative response. This indicates to the KCM that there is at least one EE that may require encryption metadata. However, it should be understood that in some embodiments, some ILs 56 may be configured to respond negatively if any of the Handshake response command blocks from below are negative.

The DEK management protocol supports multiple "classes" of EEs. An EE of a "cooperating" class (i.e., that is capable of communicating using the DEK management protocol) ignores Handshake commands that do not contain its class name and acknowledges a Handshake addressed to its EE class name by filling in the Endpoint ID field.

See Table 2, below, for an example layout of a Handshake command block with Handshake-specific definitions of bytes 48-1535.

TABLE 2

Handshake command block format

| Bytes | Field |
|---|---|
| 0-7 | Protocol Signature |
| 8-15 | Checksum |
| 16-19 | Version |
| 20-23 | Reserved |
| 24-27 | Handshake Opcode |
| 28-31 | DEK management protocol Response Status |
| 32-39 | DEK management protocol Endpoint ID |
| 40-47 | Key Controller Handle |
| 48-303 | (256 bytes) Encryption Endpoint Class Name |
| 304-511 | (208 Bytes) Reserved |
| 512-1023 | (512 Bytes) Pseudo-random bytes |
| 1024-1151 | (128 Bytes) Reserved |
| 1152-1407 | (256 Bytes) Pseudo-random bytes |
| 1408-1535 | (128 Bytes) Reserved |

The following is a description of various command-specific fields in the Handshake command block shown in Table 2 above:

DEK management protocol Endpoint ID—8 bytes—[Out] Returned by the EE and for its internal use: the KCM 54 echoes (and thus addresses) this Endpoint ID in subsequent Probe, Query, Associate, and Disassociate commands for the Device Object. (An IL 56 creating a protocol command would use this Endpoint ID to address the EE.)

Endpoint Class Name—256 bytes—[In] Each class of EE has a name, expressed, for example, as a null-terminated ASCII string. Example endpoint class names include:

"EHBA" for an HBA 36 with encryption (i.e., an EHBA 156); "DDM" for a data de-duplication module, which is typically an external intermediate device; and "RRM" for a remote replication module, which is typically an external intermediate device.

Pseudo-random bytes [512-1023]—512 bytes—[In/Out] "Handshake" region #1 is filled with pseudo-random data by the KCM 54 and sent down to the EE. The EE signals its presence in the storage I/O stack 46 to the KCM 54 by, for example, reversing the order of all 512 bytes in this region. This field is passed through untouched by ILs 56, although if multiple Handshake response command blocks are received from below, the IL 56 will choose the field from the appropriate received Handshake response command block to indicate affirmative or not, as appropriate. This field may also be generated by an IL that creates a command.

Pseudo-random bytes [1152-1407]—256 bytes—[In/Out] "Handshake region #2 is similar to "handshake" region #1. The Encryption Endpoint reverses all 256 bytes in this region before returning a response to the command.

Reserved bytes [20-23, 304-511, 1024-1151, 1408-1535]—468 bytes—Undefined. Reserved for future use. Set to 0x00 by the KCM 54, ignored by the IL 56 and EE. These bytes are covered by the checksum. An IL 56 should not overwrite them. They are included in checksum to guard against false positive of a SCSI or other I/O command being interpreted as a DEK management protocol command.

The EE is expected to update the version field if the version supported by EE is different than requested by KCM 54. The ILs 56 are also expected to ensure version compatibility with the EE. If the EE supports a lower version than required by the IL 56, IL 56 should fail the Handshake request.

Referring again to FIG. 7, in step 213 the KCM 54 may send a Probe command down to the next IL 56 to probe for the existence of "non-protocol-aware" intermediate layer virtualization drivers in the device stack 46, where "non-protocol-aware" means that the driver either cannot (or for some reason just does not) recognize and act on the DEK management protocol messages in the transport read commands/responses. Based on receipt of the "Success" Response Status at the end of the Handshake stage, the KCM 54 is aware of the EE's presence, and the collection of drivers in the stack 46 have managed to correctly pass the Handshake command down the stack 46 and its response up the stack 46. However, it is possible that there are intermediate layers that do not actually recognize the protocol, just blindly forwarding the transport messages that carry them. If any such non-protocol-aware intermediate layers are remapping layers, it may result in data corruption during operation. A remapping layer is responsible for correctly modifying other protocol commands (e.g., Query and Associate as described below) based on their remapping behavior so that correct results are obtained from use of those commands. If this is not done, then encryption may be applied to the wrong areas of a device 20, potentially making data inaccessible.

The Probe command and response are not described in detail. One basic approach to probing is to place the same address information in the transport message as well as in the Probe command itself, and to compare the two pieces of address information at a lower-layer protocol endpoint such as an EHBA driver 47 that receives the Probe command. If the two pieces of address information match, it is an indication that either there is no remapping in the stack 46 or that any remapping is being done by a protocol-aware remapping component that modifies the address information in both locations. If the pieces of address information do not match, it is an indication that there is a non-protocol-aware remapping component that changes the address in the transport message (according to its remapping) but is unaware of the Probe command and does not change the address information therein. The detection of non-matching addresses can then be signaled to the KCM 54 in the Probe response.

Referring again to FIG. 7, in step 214, KCM 54 sends a Query command down to the next IL 56 to determine if an encryption capability such as hardware-assisted encryption is supported for a specified range on an LV. Each IL 56 between the KCM 54 and the EE responds to the Query based on the encryption capabilities of the underlying components.

An IL 56 broadcasts the Query command to all the underlying components and aggregates the results of individual queries into one response to the KCM 54 (or an IL 56 above it). The response from an IL 56 should not lead to data corruption. For example, an IL managing a virtual volume spanning two underlying LUs should support hardware-assisted encryption on the virtual volume only if the paths to both the LUs have hardware-assisted encryption available.

For example, if the IL 56 is a virtualization module 60 that virtualizes a logical volume across two storage devices 20(a) and 20(b), then virtualization module 60 sends two copies of the Query command block down the storage I/O stack 46, one referencing storage device 20(a) as the device object, and the other referencing storage device 20(b) as the device object. Generally, only if the virtualization module 60 receives affirmative Query response command blocks for both storage devices 20(a) and 20(b) will the virtualization module 60 respond back to the KCM 54 with an affirmative response, however, this behavior may differ if a particular form of virtualization is performed that allows otherwise.

For example, in the case of a read-only LV mirrored onto two or more distinct LUs, as long as one of the LUs is readable with encryption at the level of an EHBA 156, the virtualization module 60 may return an affirmative response, even if a negative response is returned for one of the LUs.

As an alternate example, if the IL 56 is a multipathing module 62 having paths through multiple HBAs 36 to a given storage device 20, then the multipathing module 62 sends copies of the Query command block to all such HBAs down the storage I/O stack 46. If the multipathing module 62 receives any affirmative Query response command blocks, the virtualization module 60 responds back to the KCM 54 with an affirmative response.

An EE looks for the Endpoint ID in the payload that matches its ID (i.e., the Endpoint ID that is sent up by the EE to the KCM 54 in the Handshake response), and returns affirmatively if it can perform encryption on the specified ranges for the device object. Otherwise the EE may return in the negative (e.g., if the EE does not have a connection to the appropriate storage device 20, if the EE was not initialized, or if the EE is temporarily busy and the command should be retried).

Included within the Query command is a LUN Map, which defines the areas subject to encryption. Each area is provided with reference to a Logical Block Address (LBA), which is an abstraction of the block addresses at a given layer of logical abstraction. Returning to the example provided above in which logical volume L1 122(a) is an encrypted LV 10 megabytes in size, blocks 1,536-10,239 and 11,264-20,479 of logical volume L1 122(a) would be listed as subject to encryption.

Some ILs 56 may remap the LUN map as appropriate. These ILs 56 are referred to as "remapping" ILs 56. For example, a virtualization module 60 is an example of a remapping IL 56, while a typical multipathing module 62 is not a remapping IL 56. Recall that, in the example, blocks 0-10,239 of logical volume L1 122(a) are stored on D1 140(1), while blocks 10,240-20,479 are stored on D4 140(4). Further suppose that the encrypted blocks stored on D1 140(1) begin at local block 1,000,000, while the encrypted blocks stored on D4 140(4), begin at local block 2,097,152, but actually are spread out across 2 ranges: 2,097,152-2,101,759 and 3,145,728-3,150,335. Therefore, in the Query command passed on to storage device D1 140(1), the LUN Map will indicate LBAs 1,000,000-1,008,703; and in the Query command passed on to storage device D4 140(4), the LUN Map will indicate LBAs 2,097,152-2,101,759 and 3,145,728-3,150,335.

See Table 4, below, for an example layout of a Query command block.

TABLE 4

Query command block format

| Bytes | Field |
|---|---|
| 0-7 | Protocol Signature |
| 8-15 | Checksum |
| 16-19 | Version |
| 20-23 | Reserved |
| 24-27 | Query Opcode |
| 28-31 | DEK management protocol Response Status |
| 32-39 | DEK management protocol Endpoint ID |
| 40-47 | Key Controller Handle, Undefined |
| 48-71 | (24 bytes) Undefined |
| 72-75 | (4 bytes) LUN Map Count |
| 76-83 | (8 bytes) Starting LBA Entry [0] |
| 84-91 | (8 bytes) Number of Blocks [0] |

TABLE 4-continued

Query command block format

| Bytes | Field |
|---|---|
| 92-99 | (8 bytes) Starting LBA Entry [1] |
| 100-107 | (8 bytes) Number of Blocks [1] |
| 108-1019 | LBA Range Structures [2] to [58] |
| 1020-1027 | (8 bytes) Starting LBA Entry [59] |
| 1028-1035 | (8 bytes) Number of Blocks [59] |
| 1036-1535 | Reserved |

The following is a description of the various fields in the Query command block shown in Table 4 above:

DEK management protocol Endpoint ID—8 bytes—[In] Returned by the EE in the Handshake command response, echoed back by KCM 54, thus addressing the Endpoint ID.

Undefined bytes [48-71]—24 bytes—[In/Out] Undefined, can be anything. Included in checksum.

LUN Map Count—4 bytes—[In] Number of valid LUN Map entries being queried. Must be at least one and not greater than the total entries that can fit in the read buffer, (e.g., 60.) The IL 56 validates the map.

LUN Map Entry—16 to 960 bytes (up to 60 16-byte structures)—[In] The LUN map is a list of LBA ranges on the LU. Each LUN Map entry contains 2 sub-entries, each of which is, for example, a 64-bit integer: a starting LBA; and a number of blocks. Any remapping IL 56 can adjust the starting LBA and/or number of blocks as the request for association flows down the stack.

Reserved bytes [1036-1535]—Undefined and reserved for future use.

Recall that, if step 210 returns an affirmative response, execution proceeds with step 216, while if step 210 returns a negative response, execution may proceed with step 220. In some embodiments, step 216 may also be executed on its own, without first performing step 210.

In step 216, KCM 54 sends encryption metadata associated with the encrypted LV from the KCM 54 to the EE via ILs 56, the encryption metadata identifying an encryption key and one or more encrypted regions of the LV. The encryption metadata may also identify other associated encryption information needed to perform the encryption algorithm, such as, for example, an identification of the encryption algorithm. The sending results in establishment of one or more shared associations between the KCM 54 and the EE, the shared associations associating the encrypted LV with the encryption metadata for the encrypted LV. In one embodiment, this step is accomplished using the DEK management protocol by sending a DEK Management Associate command.

The Associate command creates an association of (1) an Encryption Key Blob, with (2) a LUN Map on (3) a Device Object, thereby effectively turning on hardware-assisted encryption for the LU and LBA Range(s). The Key Blob is a set of encryption metadata, storing the key and all the other information needed to perform encryption/decryption that is stored on the key manager, as described below. In an alternative embodiment, the key ID may be sent within the Associate command instead of the key blob, requiring the EE to obtain the key information directly from the key manager server 12. Alternatively, in some embodiments, an encrypted version of the key blob, referred to as a "wrapped" key blob, may be sent, requiring the EE to decrypt the wrapped key block to obtain the key information. Multiple Key Blob/LUN Map Associations can be made for a Device Object. Associate commands can be generated by the KCM 54 and by ILs 56, although ILs 56 do not originate an association, but rather pass on one or more copies (with modifications as necessary) of an Associate command received from above. In some cases, the association may also include Application information.

There are two forms of an Associate command:

New Association—creates a new association. In the case of a new association, the Associate command block arrives at the EE or IL 56 with a Null "Association Handle" (see below). This tells the EE/IL 56 that this association does not currently exist, that it should be created and that an Association Handle reference should be created and returned in the Associate response.

Refresh Association—the Refresh Association originates from the KCM 54 and exists for the benefit of the ILs 56 or the EE. In the case of a Refresh Association, the Associate command block arrives at the EE or IL 56 carrying the Association Handle created by the EE (or an IL 56) as part of a preceding initial association.

An EE should respond as follows for the different Association types/association handle values:

If the Association Handle is NULL—it means the KCM 54 or an IL 56 is creating a new Association, so the EE should:

Validate the parameters as needed (see below).

Create the Association.

Return a Handle for the Association.

If the EE already has an association, provided there is no range overlap, it should ignore the existing association and treat the request as a new association.

If the Association Handle is not Null—it means the Association exists, so the EE should:

If the Associate carries the same LUN Map and Key Blob specified in the original Associate, then return Success status.

Else—something is wrong, this should not happen—so respond negatively by returning an Association Exists status.

Any Associate command (whether the first or a repeat) should be preceded by a Query command—though the EE does not need to enforce this.

Figure 8:
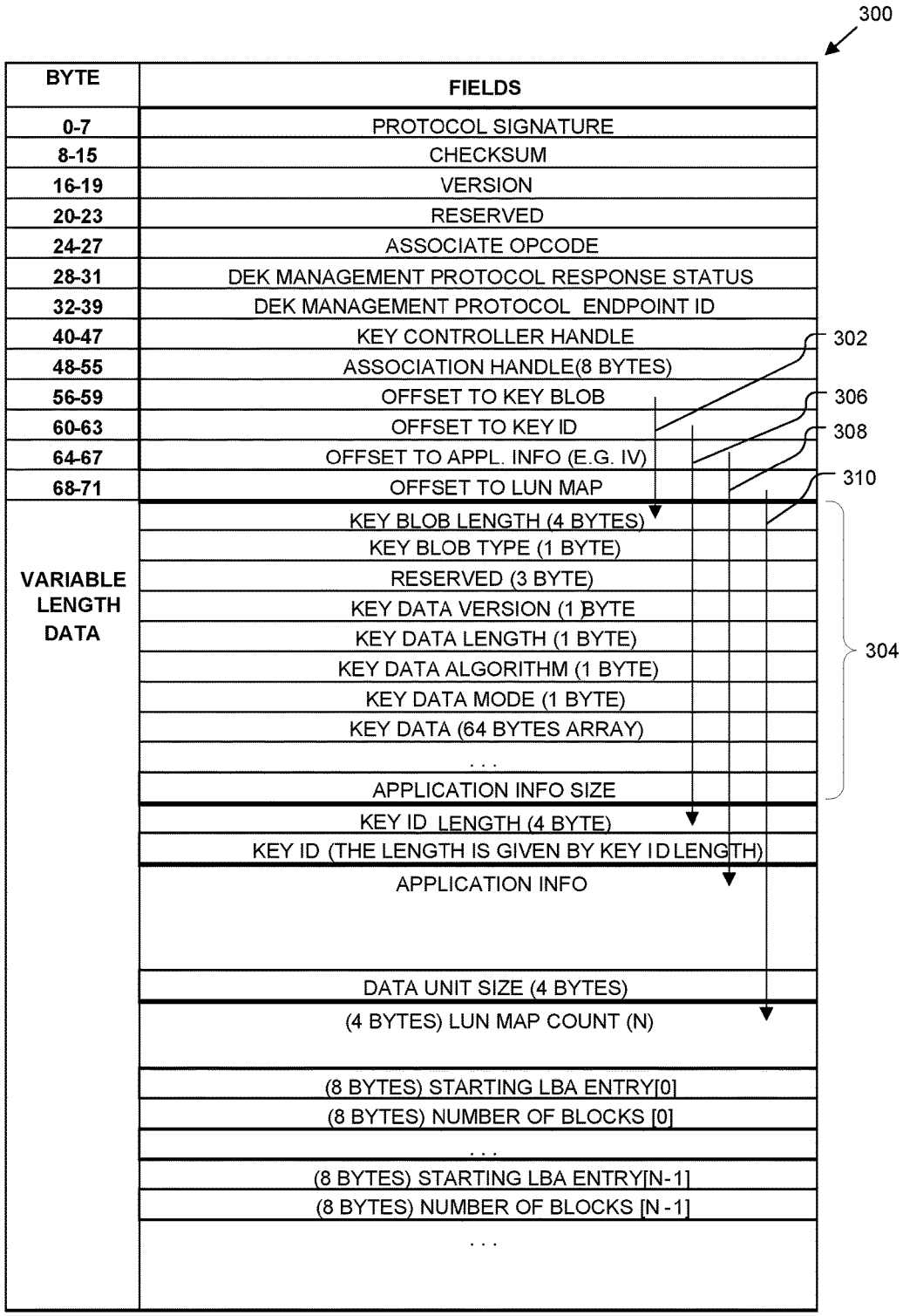
FIG. 8 depicts an example structure of one type of protocol command according to one embodiment of the invention.

FIG. 8 shows an example layout of an Associate command block. The following is a description of the various fields in the Associate command block shown in FIG. 8:

DEK management protocol Response Status—4 bytes—[Out] possible returns are Success, Invalid HW State, No Memory, Busy, Invalid Range, Invalid Key, Association Exists, Association Overflow.

DEK management protocol Endpoint ID—8 bytes—[In] Echoed from the EE's response to the initial Handshake command. Address of the EE for the Associate. The EE passes on an Associate command that does not contain the EE's Endpoint ID.

Association Handle—8 bytes—[In/Out]

[In] Zero—first time Association. An Association Handle is returned by the EE or IL 56. The handle is an internal value used by the EE or IL 56 for accessing an association. The Association Handle is subsequently passed back down by the KCM 54 to the EE in Update and Disassociate commands. An EE assigns a unique association handle for each association created. ILs 56 may need to replace the association handles based on their internal device mappings, so that a single handle is returned to the KCM 54. An IL 56 keeps track of the handle(s) returned from below it and uses those handles for passing down any subsequent Associate or Disassociate command.

[In] Non-zero implies KCM 54 is attempting to refresh an existing association. When dispatching it to the newly discovered devices, the ILs 56 should zero out the association handle and replace the handle with the new handle on the way up to KCM 54.

Data Encryption Key Parameters—

The association handle is followed by offsets to various data items 304:
  Key Blob 304 (4 bytes) (offset shown as 302 in FIG. 9)
  Key ID (4 bytes) (offset shown as 306 in FIG. 9)
  Application Info (4 bytes) (offset shown as 308 in FIG. 9)
  LUN Map (4 bytes) (offset shown as 310 in FIG. 9)

These offsets 302, 306, 308, 310 are followed by the following variable length parameters:

Key Blob 304
  Key Blob Length—4 bytes[In]—The number of bytes in the key blob Key Blob Type—1 byte [In]—This field indicates whether the format of the key blob is "wrapped" (i.e., encrypted, as, for example, it may be when being sent within a highly-secure system) or "unwrapped" (i.e., unencrypted, as, for example, it may be when being sent to an EHBA 156 within the host 16).
  Key Data
  Key Data Version—1 byte [In]—Versioning information for the key data
  Key Data Length—1 byte [In]—Length of the symmetric key
  Key Algorithm—1 byte [In]—Algorithm
  Key Mode—1 byte [In]—Algorithm Mode
  Key Data—64 bytes [In]—Carries the key data of the length "Key Data Length". Extra bytes, if any are, zero.
  Application info size—1 byte—[In] maximum accepted size of the application information.

Key ID
  Key ID Length—4 bytes [In]—Number of bytes in key ID
  Key ID bytes—[In]—Key ID bytes LUN Map Count—4 bytes [In]—Number of valid LUN Map entries being reported. It should be at least one. Implementations can restrict the number of LUN map entries supported.

LUN Map Array—16 to 960 bytes (up to 60 16-byte structures)—[In] Specifies the LBA ranges on the Device Object to associate with the Key Blob 304 or Key ID. Sub-fields include starting LBA and a length or LBA-count. Unused map entries are set to zero.

Reserved bytes [variable-1535]—Unused and undefined

Referring again to FIG. 7, upon successful completion of an Associate during step 216, an EE is ready to apply encryption/decryption to the encrypted regions of a LU as defined in the LUN map, using the encryption metadata from the Key Blob and the application information. As long as the association remains active, subsequent read/write commands directed to these regions employ decryption/encryption (by a hardware encrypting component 68) using the encryption metadata. This operation is depicted in step 218.

The DEK management protocol may also employ Update and Disassociate commands. An Update command tells the EE to update the association for the Device Object with the Key Object and LUN map information in the protocol command block. It provides an atomic way for an EE to effectively delete and create an association in one step. It would be used, for example, to support resizing of an encrypted LU.

The Disassociate Command deletes the association that had been created with a previous Associate command for a Device Object. Subsequent read and write commands in the LBA range(s) covered for that association are no longer encrypted/decrypted by the EE. Disassociate is used when the EE can no longer perform its duties and a switch to encrypting using the crypto kernel 64 is needed. Switching back happens through a new Associate command. An example, looking back at FIG. 5, would be if EHBA1 failed for some reason. D1 and D4 would still be reachable by EHBA3 and NHBA1, respectively, but the Crypto kernel 64 would have to be used so the Disassociate would be sent on L1.

Both the Update (which, in some embodiments, is an Associate command containing a valid non-null handle) and Disassociate commands include an Association Handle to identify the subject association.

Figure 9:
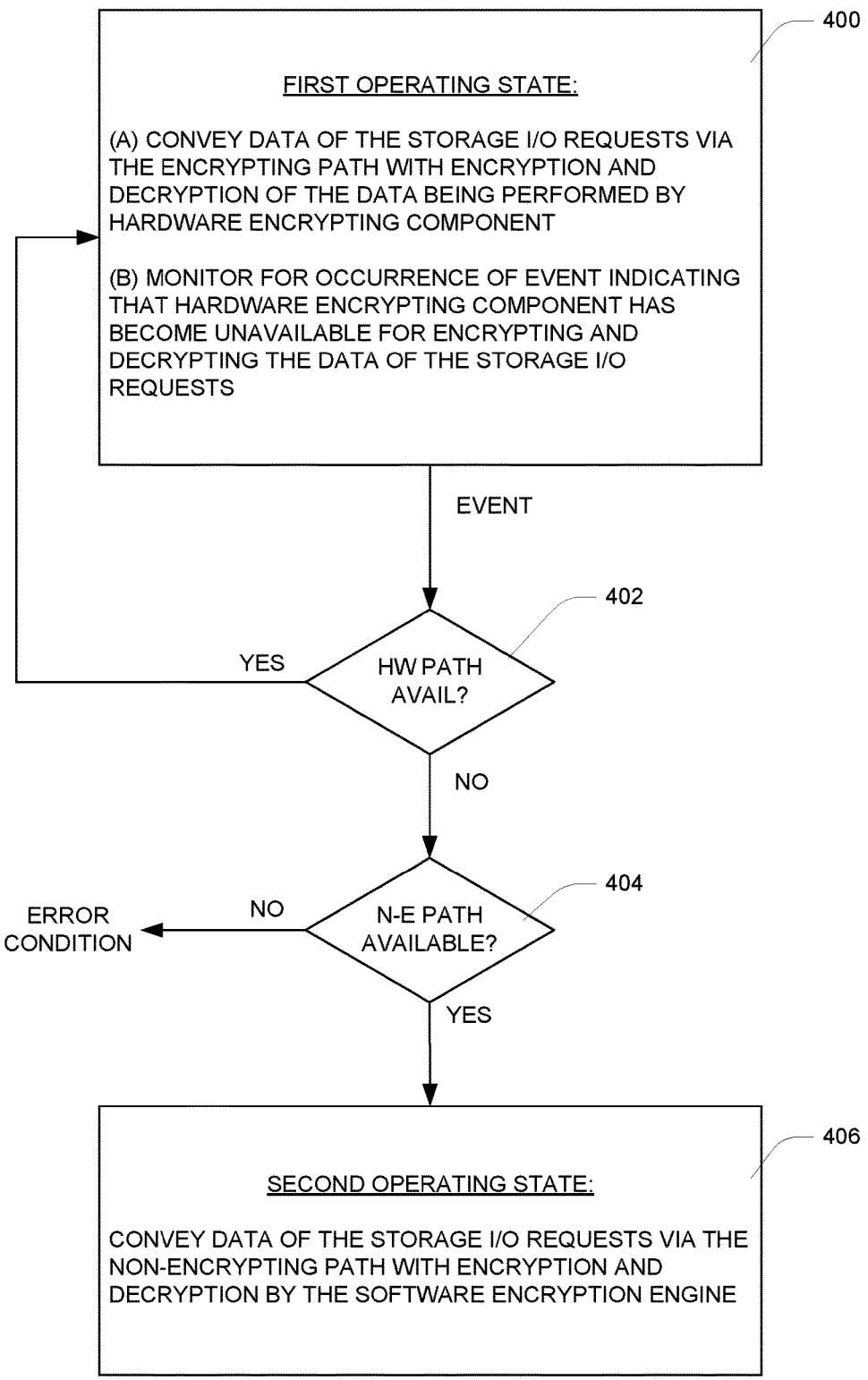
FIG. 9 is a flow diagram of a transition from hardware-assisted encryption to software encryption.

FIG. 9 illustrates certain operation of a host 16 as briefly mentioned above, namely switching from hardware-assisted encryption to software encryption under certain conditions. This operation is with respect to a particular encrypted logical volume (LV) as discussed above. The operation assumes the presence of the crypto kernel 64, referred to here as a software encryption engine, and path circuitry that includes a hardware encrypting component and that provides one or more paths for conveying data of storage I/O requests to and from a storage device that stores the LV. I/O requests may be generated by different sources, such as the file system 42 via the logical volume manager 44. The term "path circuitry" refers to a set of one or more HBAs 36 and their interconnections to the subject storage device. As an example with reference to FIGS. 6A and 6B described above, the path circuitry for the device D1 140(1) includes EHBA1 156(1), EHBA3 156(3) and NHBA1 256(1), along with respective interconnections within the storage interconnect 18. The hardware encrypting component may be a hardware encrypting component 68 on one of the EHBAs 156 of the path circuitry.

Referring to FIG. 9, at 400 the host 16 is operating in a first operating state in which hardware-assisted encryption is being used to encrypt and decrypt the data of storage I/O requests directed to the LV. In particular, the data of the storage I/O requests is conveyed via an encrypting path with encryption and decryption of the data being performed by the hardware encrypting component of one or more EHBAs 156. Additionally, there is monitoring for occurrence of an event indicating that the hardware encrypting component has become unavailable for encrypting and decrypting the data of the storage I/O requests. Some details of such monitoring are provided below.

If the event has not occurred, then operation continues in the first operating state at 400. If the event has occurred (shown as EVENT in FIG. 9), then operation proceeds to 402, which represents a test whether the path circuitry continues to provide at least one hardware encrypting path (HW PATH) for conveying the data of the storage I/O requests to and from the storage device. If so, then operation continues in the first operating state at 400. If not, then at 404 there is a second test whether there is a non-encrypting path (N-E PATH) available for conveying the data of the storage I/O requests to and from the storage device. If not, then an error condition exists because the storage device is not reachable. I/O requests directed to the storage device will receive a response indicating that the I/O request was not successfully completed (generated by a path-aware component such as the multipathing module 62 for example)

If at 404 the path circuitry provides at least one non-encrypting path for conveying the data of the storage I/O requests to and from the storage device, then operation enters a second operating state 406 in which the data of the storage I/O requests is conveyed via the non-encrypting path and is encrypted and decrypted by the software encryption engine (e.g., crypto kernel 64). It will be appreciated that this manner of operation may employ an NHBA 256, or potentially an EHBA 156 in which only the hardware encrypting component 68 is affected by a failure and the I/O processing circuitry 66' (which has not failed) continues to be usable for I/O requests apart from any encryption/decryption operations.

The monitoring (B) of step 400 is performed in part by the multipathing module 62 of FIG. 3, which maintains an awareness of available paths to storage devices 20 as part of its multipathing function. The multipathing module 62 monitors the completion status codes that are returned by lower-layer components when processing storage I/O commands, and may detect the return of an error response code as discussed above. In other cases, the multipathing module 62 is notified of other events indicating that a path has become unavailable, as part of its general path awareness as discussed above. For such notifications, the multipathing module 62 ascertains whether a subject path includes an EHBA 156.

The multipathing module 62 then signals the KCM 54 of the I/O request failure or other path event, which causes the KCM 54 to perform a process of determining whether to switch to the second operating state 406. When an I/O request has failed, it is temporarily set aside for later re-issuance, and the KCM 54 then attempts to renegotiate the encryption state of the subject encrypted logical volume. As described above, this process starts with issuance of a Query command. In this case the multipathing module 62 sends a Query response indicating that there is no hardware-assisted encryption available. The KCM 54 then issues a Disassociate command, removing any existing associations and causing the EHBAs 156 to not apply any encryption/decryption operation to the target device, and it modifies the encryption state of the device to software encryption (i.e. moves operation to second operating state 406). Any I/O requests that were set aside are then re-issued. Due to the state change, the data of these requests (as well as that of future new I/O requests) is now encrypted/decrypted by the crypto kernel 64, and no hardware-assisted encryption/decryption is performed along the path(s) to the storage device 20.

Figure 10:
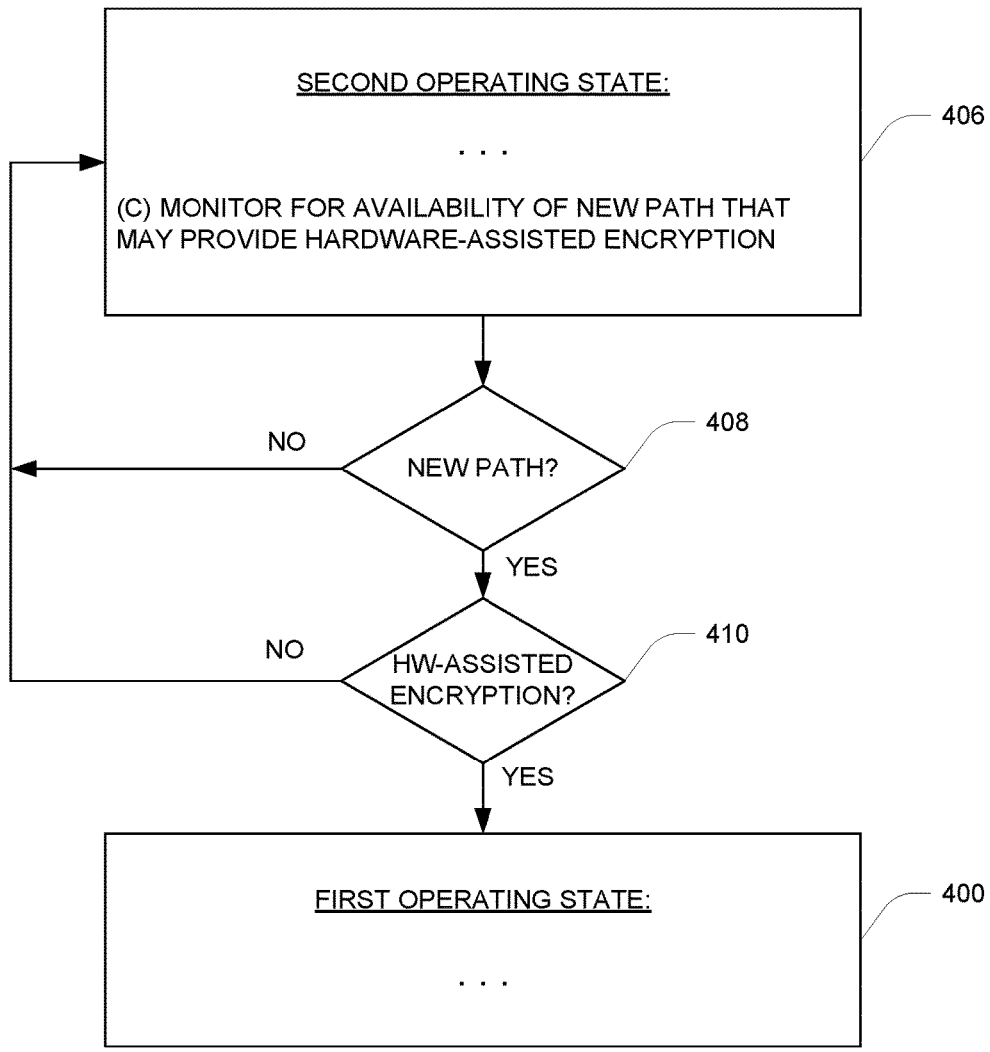
FIG. 10 is a flow diagram of a transition from software encryption to hardware-assisted encryption.

FIG. 10 illustrates the reverse transition from that of FIG. 9, i.e., the transition from software encryption to hardware-assisted encryption for an LV. It should be noted that this operation may occur after a transition of the type shown in FIG. 9, in which case it represents a "fail-back" to a previous state of using hardware-assisted encryption (for example when a failed EHBA 156 is replaced by a working EHBA 156), but it can also be an initial transition into hardware-assisted encryption, such as when an EHBA 156 is first added to a system, a new path containing an EHBA 156 is discovered, or other similar conditions. In this respect, it may be desirable that any newly discovered path be initialized to a state of software encryption, and then switched to hardware-assisted encryption only after a process of identifying hardware encryption capability is carried out. Other approaches can be used in alternative embodiments.

The process begins in the second operating state 406 as described above, now including a step (C) of monitoring for availability of a new path that may provide hardware-assisted encryption, where a "new path" could be a newly discovered path that was previously unknown (e.g., due to insertion of a new HBA 56 in a host 16), or renewed availability of a previously known path that had been unavailable. As previously indicated, this monitoring is part of the path-awareness operation of the multipathing module 62. Step 408 represents the result of this monitoring. When there are no new paths, operation continues in state 406. When a new path is found, then the multipathing module 62 notifies the KCM 54 of such a new path and operation proceeds to 410 where it is determined whether the new path provides hardware-assisted encryption. This determination may be made in the manner described above with reference to FIG. 7. If hardware-assisted encryption is not provided (corresponding to the "NO" branch from 210 in FIG. 7), then operation continues in the second operating state 406. If hardware-assisted encryption is provided (corresponding to the "YES" branch from 210 in FIG. 7), then operation proceeds to the first operating state 400 as described above.

The above-described processes of switching between hardware-assisted and software encryption may generally be used as long as the software encryption component (e.g., crypto kernel 64) and the hardware-based encryption component (e.g., EHBA 156) perform the same encryption and decryption operations, which includes for example use of the same encryption key for a given encrypted region of storage. There are certain encryption algorithms that may include an address-associated value as an input to the encrypting and decrypting calculations, in order to obtain the effect that the same data stored in different locations are encrypted to different values. Among such algorithms are those referred to as "tweakable", referring to the address-associated value as a "tweak". Algorithms that include an address-associated value in the encrypting and decrypting calculations are referred to herein as "address-dependent" encryption algorithms. To support the use of such algorithms, it is necessary to ensure that the address-associated value used in the encryption and decryption processes is consistent. This is complicated by the use of a remapping IL 56 that changes the location (address) of data from the location as seen by the KCM 54. If a switch were to be made between hardware-assisted and software encryption without any special consideration, data that was encrypted by an EHBA 156 could be non-decryptable by the crypto kernel 64, because the EHBA 156 used an address-associated value derived from a re-mapped address while the crypto kernel 64 uses one derived from an original address known to the KCM 54.

To address this complication and support the use of address-dependent encryption algorithms, additional address information can be included in the LUN maps of the protocol commands described above and used for calculation of tweak values. In particular, an address referred to as a "starting crypto LBA" can be included along with the starting LBA and length values provided in each LUN map entry. The starting crypto LBA remains unchanged by remapping ILs, so that all layers of the stack have access to the same starting crypto LBA information. All encrypting components (e.g., EHBA 156 and crypto kernel 64) utilize the starting crypto LBA in their encryption/decryption operations rather than using the starting LBA or any other potentially remapped address value.

The expanded LUN map entry may thus include three values as shown below:

| Data Type | Representation |
|---|---|
| 64 bit integer | Starting LBA |
| 64 bit integer | Starting Crypto LBA |
| 64 bit integer | Number of blocks |

It will be appreciated that the data type, specifically the size, may vary in different embodiments.

The starting crypto LBA is used to calculate address-associated values in the encryption and decryption of all blocks of the region defined by the LUN map entry. Intermediate layers are allowed to change the starting LBA but should preserve the starting crypto LBA information as a LUN map flows down the stack, so that consistent address-associated values are calculated at every level.

It may be necessary to modify the starting Crypto LBA in certain cases in order to enable correct calculation of an address-associated value. In one scheme, an address-associated value for a given block of data is calculated by adding its offset within the region defined by a LUN map entry to the starting crypto LBA. For example, the $5^{th}$ block in a region will be encrypted using an address-associated value equal to the sum (starting crypto LBA+5). In the case that a region defined at one layer of the stack 46 is split into multiple regions at a lower layer, the starting crypto LBA for all but the first region of the lower layer is adjusted to reflect the position of the lower-level region within the higher-level region, so that the address-associated value is calculated correctly for all regions.

An example is provided for illustration. Assume that a 10-block region has a starting LBA of 0 and a starting crypto LBA of 0 at the level of the KCM 54. This region is both remapped (to different starting LBA) and divided into two smaller regions (of sizes 4 and 6) at the level of the EHBAs 156 as follows:

Region 1. Starting LBA=1000, starting crypto LBA=0; length=4

Region 2. Starting LBA=4004, starting crypto LBA=4, length=6

The starting crypto LBA for Region 2 is changed to correspond to the location of the first block of the region in the original undivided region (in this case 4). To illustrate the calculation of address-associated values, in this example the block at offset 7 in the original undivided region should be encrypted using an address-associated value of 7 (offset of 7 plus the starting crypto LBA of 0). This block is located at offset 3 in Region 2 above. Due to the adjustment of the starting crypto LBA to the value of 4, the correct address-associated value is still used—offset of 3 plus starting crypto LBA of 4 equals 7.

It will be appreciated that in alternative embodiments, the encryption algorithm may calculate address-associated values from address information in some different way, and there may be correspondingly different rules for how to adjust the starting crypto LBA value (or its equivalent address information) to ensure that consistent address-associated values can be calculated by all encrypting components (e.g., EHBA 156 and crypto kernel 64).

While various embodiments of the invention have been particularly shown and described, it will be understood by those skilled in the art that various changes in form and details may be made therein without departing from the spirit and scope of the invention as defined by the appended claims.

What is claimed is:

1. A computer for use in a data processing system having a storage device on which data is to be stored in encrypted form, comprising:

memory for storing an executable software encryption engine;

path circuitry initially providing one or more paths for conveying data of storage I/O requests between a source of the storage I/O requests and a storage device, the paths including an encrypting path having a hardware encrypting component, the path circuitry including a plurality of host bus adaptors having respective independent storage interconnections to the storage device, each host bus adaptor being a hardware interface module providing a hardware interface between processing circuitry of the computer and the respective storage interconnection, one of the host bus adaptors being an encrypting host bus adaptor having the hardware encrypting component and through which the encrypting path extends, another of the host bus adaptors being a non-encrypting host bus adaptor through which a non-encrypting path extends; and processing circuitry operative to cause the computer to perform a method supporting encryption of data of the storage device, the method including:

in a first operating state, (a) conveying the data of the storage I/O requests via the encrypting path with encryption and decryption of the data being performed by the hardware encrypting component, and (b) monitoring for occurrence of an event indicating that the hardware encrypting component has become unavailable for encrypting and decrypting the data of the storage I/O requests; and upon occurrence of the event indicating that the hardware encrypting component has become unavailable for encrypting and decrypting the data of the storage I/O requests, and only if the path circuitry provides the non-encrypting path for conveying the data of the storage I/O requests to and from the storage device, then switching to a second operating state in which the data of the storage I/O requests is conveyed via the non-encrypting path and is encrypted and decrypted by the software encryption engine;

wherein the memory further stores an I/O filter driver executed by the processing circuitry to form an I/O stack of functional elements between an operating system of the computer and a driver for the host bus adaptors, the I/O filter driver including the software encryption engine as well as an encryption manager and a multipathing module, the encryption manager handling a reconfiguring of encryption operation from use of the hardware encrypting component to use of the software encryption engine in the second operating state, the multipathinq module handling the conveying of the data of the storage requests and the monitoring for the event as well as reporting the event to the encryption manager, and wherein the data of the storage I/O requests passes through the multipathinq module in unencrypted form in the first operating state to be encrypted by the hardware encrypting component of the encrypting host bus adaptor, and the data of the storage I/O requests passes through the multipathinq module in encrypted form after being encrypted by the software encryption engine in the second operating state.

2. A computer according to claim 1, wherein the method further includes the step, performed upon occurrence of the event indicating that the hardware encrypting component has become unavailable for encrypting and decrypting the data of the storage I/O requests, of testing whether the path circuitry continues to provide one or more other encrypting paths for conveying the data of the storage I/O requests to and from the storage device, and if so then remaining in the first operating state and conveying the data of the storage I/O requests via one of the other encrypting paths, and wherein switching to the second operating state and conveying the data of the storage I/O requests via the non-encrypting path is performed only if the path circuitry does not provide the one or more other encrypting paths.

3. A computer according to claim 1, wherein monitoring for occurrence of the event includes monitoring for occurrence of a failed storage I/O request directed to the storage device.

4. A computer according to claim 3, wherein monitoring for occurrence of the event further includes attempting to renegotiate an encryption state of the storage device, the attempting being performed by a key controller module of the data processing system in response to the failed storage I/O request, the attempting resulting in an indication to the key controller module that no hardware-assisted encryption is provided for the storage device.

5. A computer according to claim 4, wherein attempting to renegotiate the encryption state of the storage device includes engaging in a data encryption key management protocol between a key controller module and the path circuitry, the data encryption key management protocol including a query command and corresponding response, the query command being usable by the key controller module to ascertain the presence and capability of a hardware encrypting component, the response being usable by components of the path circuitry to indicate presence or absence of a hardware encrypting component.

6. A computer according to claim 1, wherein switching to the second operating state includes sending a command to the path circuitry to cease use of hardware-assisted encryption for the storage device to prevent non-failed I/O processing circuitry from attempting to utilize a failed hardware encrypting component.

7. A computer according to claim 6, wherein the command effects a disassociation of an encryption association previously established in the path circuitry for storage I/O requests directed to the storage device.

8. A computer according to claim 1, wherein the method performed by the processing circuitry further includes:

in the second operating state, monitoring for the availability of a new path in the path circuitry to the storage device, and determining whether the new path provides hardware-assisted encryption and decryption of the data of the storage I/O requests to, and only in the event that the new path provides hardware-assisted encryption and decryption of the data of the storage I/O requests, then switching to the first operating state.

9. A computer according to claim 8, wherein determining whether the new path provides hardware-assisted encryption and decryption includes engaging in a data encryption key management protocol between a key controller module and the path circuitry, the data encryption key management protocol including commands and corresponding responses, the commands being usable by the key controller module to ascertain the presence of a hardware encrypting component and to control the encryption and decryption operation thereof, the responses being usable by components of the path circuitry to indicate presence or absence of a hardware encrypting component and to indicate successful and unsuccessful results for encryption-related control actions taken by the key controller module.

10. A computer according to claim 9, wherein the data processing system uses an address-dependent encryption operation by which an address-associated value is included as an input in encryption and decryption operations, the address-associated value for each block of data being calculated based on a location of the block of data on a storage device, and wherein the data encryption key management protocol includes a mechanism for carrying crypto address information to be used by the hardware encrypting component in calculating the address-associated value, the mechanism including preserving the crypto address information between the key controller module and the path circuitry even by components that modify the location of the block of data from a first location seen by the key controller module to a second location seen by the path circuitry.

11. A computer according to claim 8, wherein the new path is immediately available for use as a software-encrypting path before it is determined whether the new path provides hardware-assisted encryption and decryption.

12. A computer according to claim 1 wherein the non-encrypting host bus adaptor includes I/O processing circuitry and a second hardware encrypting component, the second hardware encrypting component being unusable for encryption operation in the second operating state while the I/O processing circuitry is usable for processing the storage I/O requests apart from encryption operation.

* * * * *